US007343485B1

(12) United States Patent
Huang et al.

(10) Patent No.: US 7,343,485 B1
(45) Date of Patent: Mar. 11, 2008

(54) SYSTEM AND METHOD FOR MAINTAINING PROTOCOL STATUS INFORMATION IN A NETWORK DEVICE

(75) Inventors: Dehua Huang, Fremont, CA (US); Adam J. Sweeney, Sunnyvale, CA (US); Richard A. Johnson, Santa Barbara, CA (US); Silviu Dobrota, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 740 days.

(21) Appl. No.: 10/654,388

(22) Filed: Sep. 3, 2003

(51) Int. Cl.
*H04L 9/00* (2006.01)

(52) U.S. Cl. ........................ 713/153; 726/14
(58) Field of Classification Search ................ 726/12, 726/13, 14
See application file for complete search history.

(56) References Cited

U.S. PATENT DOCUMENTS

| 5,550,984 | A | * | 8/1996 | Gelb ........................... 709/245 |
| 6,070,187 | A | * | 5/2000 | Subramaniam et al. ...... 709/220 |
| 6,108,786 | A | * | 8/2000 | Knowlson ..................... 726/11 |
| 7,134,012 | B2 | * | 11/2006 | Doyle et al. ................ 713/151 |
| 2002/0032871 | A1 | | 3/2002 | Malan et al. ................ 713/201 |
| 2003/0002436 | A1 | * | 1/2003 | Anderson et al. ........... 370/218 |
| 2004/0064559 | A1 | * | 4/2004 | Kupst et al. ................. 709/226 |
| 2004/0071164 | A1 | * | 4/2004 | Baum ........................ 370/469 |
| 2004/0258074 | A1 | * | 12/2004 | Williams et al. ......... 370/395.5 |
| 2005/0027837 | A1 | * | 2/2005 | Roese et al. ................ 709/223 |

OTHER PUBLICATIONS

M. Patrick, Motorola BCS, Network Working Group—Standards Track, "DHCP Relay Agent Information Option," Jan. 2001, pp. 1-14, http://www.freesoft.org/CIE/RFC/Orig/rfe3046.txt.
"Chapter 17: Understanding and Configuring DHCP Snooping," Cisco IOS Software Configuration Guide—Release 12.1(12c)EW, Jul. 11, 2003, pp. 17-1-17-4.
*Configuring Unicast Reverse Path Forwarding*; Aug. 21, 2003; 16 pages; http://www.cisco.com/univercd/cc/td/doc/product/software/ios122/122cgcr/fsecur_c/fothersf/scfrpf.htm (printed Oct. 18, 2004).
*Understanding and Configuring IGMP Snooping and Filtering*; Cisco IOS Software Configuration Guide—Release 12.1(12c)EW, Jul. 11, 2003, Updated Aug. 24, 2004; 16 pages; http://www.cisco.com/univercd/cc/td/doc/product/lan/cat4000/12_1_12/config/multi.pdf (printed Oct. 22, 2004).

* cited by examiner

*Primary Examiner*—Matthew B Smithers
(74) *Attorney, Agent, or Firm*—Campbell Stephenson LLP; Brenna A. Brock

(57) ABSTRACT

A method may involve: maintaining protocol status information for a network protocol, where the protocol status information includes protocol information generated by a protocol server and network traffic information indicative of how messages are conveyed from the protocol client to a network, and updating the protocol status information in response to intercepting a protocol message being conveyed between a protocol client and a protocol server. For example, the network protocol can be DHCP (Dynamic Host Configuration Protocol) and the protocol status information can be updated to include an IP (Internet Protocol) address assigned to the protocol client by the protocol server in the protocol message. Such a method may inhibit the misuse of one or more network protocols and/or attacks on protocol servers.

84 Claims, 7 Drawing Sheets

SYSTEM AND METHOD FOR MAINTAINING PROTOCOL STATUS INFORMATION IN A NETWORK DEVICE

FIELD OF THE INVENTION

The present invention relates to networking and, more specifically, to network devices that convey protocol messages implementing a network protocol between protocol clients and protocol servers and that use information in those protocol messages to restrict traffic between a protocol client and a network.

BACKGROUND

Various network protocols are used to provide networking services to devices. For example, DHCP (Dynamic Host Configuration Protocol) allows the dynamic assignment of IP (Internet Protocol) addresses to hosts. Network protocols such as DHCP are often implemented using a client-server model in which protocol clients request services from protocol servers, which in turn provide the requested services in accordance with the network protocol. For example, in DHCP, a DHCP client may request an IP address from a DHCP server. In response, the DHCP server sends a reply assigning an IP address to the requesting DHCP client. Thereafter, the DHCP client uses the assigned IP address in a manner consistent with the protocol.

Protocol servers that provide networking services are vulnerable to various attacks. A denial of service attack may involve a user simulating a large number of protocol clients in order to exhaust the server's available pool of resources. A denial of service attack may also involve a user sending a high rate of client requests to the protocol server in order to inhibit the ability of the protocol server to respond to legitimate client requests.

Similarly, some users may falsify or steal protocol information in order to perform undesirable activity via a network. For example, a user may simulate a protocol server and send fake protocol responses. These responses may corrupt legitimate network operation. Similarly, a user may snoop a response sent by a legitimate protocol server to a protocol client and use the network services being provided in those responses. For example, if a DHCP response assigning an IP address to a client is intercepted, the intercepting user may deceptively pretend to be the client by using the IP address obtained from the DHCP response. As these examples show, network protocols may experience various security problems that result from the network protocol misuse and/or attacks on protocol servers.

SUMMARY

Various embodiments of systems and methods for maintaining protocol status information that includes protocol information generated by a protocol server and information indicative of how messages are conveyed via a network are disclosed. Such systems and methods may be used to inhibit the misuse of one or more network protocols and/or attacks on protocol servers.

A method may involve: maintaining protocol status information for a network protocol, where the protocol status information includes protocol information generated by a protocol server and network traffic information indicative of how messages are conveyed from the protocol client to a network, and updating the protocol status information in response to intercepting a protocol message being conveyed between a protocol client and a protocol server. Such a method can be performed by a network switch or other system. In some embodiments, the network protocol is DHCP (Dynamic Host Configuration Protocol) and the protocol status information can be updated to include an EP (Internet Protocol) address assigned to the protocol client by the protocol server in the protocol message. Program instructions executable to implement such a method can be stored on a computer readable medium.

The protocol status information can include information indicating which one of several interfaces included in a network switch is coupled to convey messages to and from a particular protocol client and/or protocol server. This information can be used to verify that a protocol reply from the protocol server is received via a network interface coupled to the protocol server.

Such a method can involve initiating a security action in response to intercepting a subsequent protocol and/or non-protocol message dependent on the protocol status information. The security action may involve dropping the subsequent protocol message if the subsequent protocol message is inconsistent with the protocol status information. For example, the subsequent protocol message can be dropped if the subsequent protocol message is a type of protocol message required to be generated by the protocol server and the protocol status information indicates that an interface that received the subsequent protocol message is not coupled to receive messages from the protocol server. Similarly, the subsequent protocol message can be dropped if the subsequent protocol message identifies the protocol client as a sender of the subsequent protocol message and the protocol status information indicates that an interface that received the subsequent protocol message is not coupled to receive messages from the protocol client.

Several other security actions can be performed based on the protocol status information. For example, the subsequent protocol message may be dropped if the protocol status information indicates that a maximum rate of protocol messages has been exceeded. Also, if the subsequent protocol message is a protocol reply from the protocol server to a particular one of several protocol clients, the security action may involve unicasting the protocol reply to that particular protocol client.

The protocol status information can be accessed to determine whether a protocol client that sent a subsequent protocol message is using protocol information sent to that protocol client by the protocol server. If the protocol status information indicates that the protocol clients that sent the subsequent protocol message is using protocol information sent to a different one of the protocol clients by the protocol server, the subsequent protocol message may be dropped. Similarly, if the protocol status information indicates that the protocol client that sent the subsequent protocol message is not using protocol information generated by the protocol server according to policies associated with the protocol information, the subsequent protocol message may be dropped.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
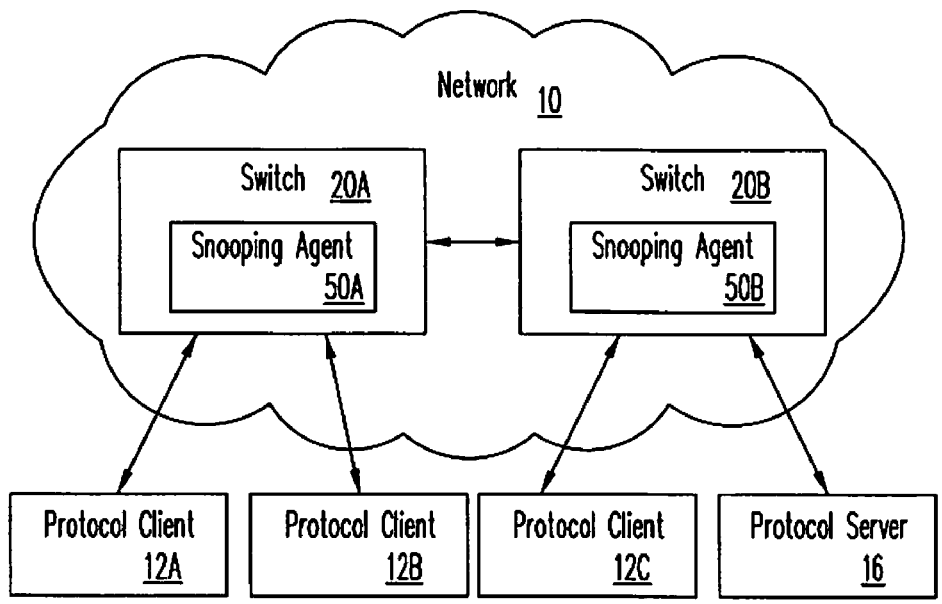
FIG. 1 is a block diagram of network coupling protocol clients to a protocol server, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

The following sets forth a detailed description of at least the best contemplated mode for implementing the devices and/or processes described herein. The description is intended to be illustrative and should not be taken to be limiting.

FIG. 1 is a block diagram of network 10 coupling protocol clients 12A-12C (collectively, protocol clients 12) to protocol server 16, according to one embodiment. Network 10 includes several network devices, including switches 20A-20B (collectively, switches 20). Note that other embodiments may include significantly more network devices (and network devices of different types, such as routers) in network 10. Each switch 20 in network 10 may be configured to handle messages from other network devices and from various computing devices coupled by the network 10. At least some of these messages may be protocol messages being sent between protocol clients 12 and protocol server 16.

In a communications network such as network 10, switching devices such as switches 20 operate by receiving data at one of a set of input interfaces and forwarding the data on to one or more of a set of output interfaces. Users typically require that such switching devices operate as quickly as possible in order to maintain a high throughput. Switches are typically data-link layer devices that enable multiple physical network (e.g., local area network (LAN) or wide area network (WAN)) segments to be interconnected into a single larger network. Switches 20 are, in some embodiments, implemented as OSI (Open Systems Interconnection) layer 2 devices. Switches 20 can include logic and/or software that provides for the forwarding of messages based on the messages' destination information.

The data received and forwarded by switches 20 is logically grouped into one or more messages. Throughout this disclosure, the term "message" is used to refer to a logical grouping of information sent as a data unit over a transmission medium. Messages may include header and/or trailer information that surrounds user data contained in the data unit. For purposes of this disclosure, a "message" may include a cell, datagram, frame, packet, segment, or any other logical group of information.

Switches 20 include various interfaces to protocol clients 12 and protocol server 16. These interfaces may include physical interfaces (e.g., on a line card internal to a switch) and/or logical interfaces (also referred to as virtual interfaces). For example, a physical interface that receives messages for several VLANs (Virtual Local Area Networks) can include several logical interfaces, one for each VLAN. Alternatively, a logical interface can be an interface that is located on a physically separate intermediate network device, coupled between the switch and a group of protocol clients, that passes messages sent by the protocol clients to the switch without making forwarding decisions (this type of interface is also described as a remote interface). Furthermore, the interfaces may be organized in various ways. For example, in some embodiments, interfaces are organized hierarchically. In one such embodiment, physical interfaces within a switch reside at the top level of the hierarchy. A physical interface to devices in several different VLANs can include several VLAN-specific logical interfaces that are organized beneath the physical interface in the switch's interface hierarchy.

In some embodiments, protocol clients 12 and protocol server 16 each include one or more of various types of computing devices. For example, protocol clients 12 and/or protocol server 16 can each be a personal computer, a workstation, an Internet server, a network appliance, a handheld computing device such as a cell phone or PDA (Personal Data Assistant), or any other type of computing device. Protocol clients 12 and protocol server 16 can also be implemented in software processes executing on such computing devices.

Protocol clients 12 and protocol server 16 can each be directly or indirectly connected to one of switches 20. For example, in some embodiments, protocol clients 12A and 12B are coupled directly to switch 20A (e.g., switch 20A is included in a wiring closet on the same site as protocol clients 12A and 12B). In other embodiments, protocol clients 12A and 12B are indirectly coupled to switch 20A through one or more intermediate network devices that send messages received from protocol clients 12A and 12B to switch 20A. Similarly, switches 20A and 20B can be directly or indirectly coupled to each other. For example, one or more routers (as well as one or more other switches or other network devices) can be interposed between switch 20A and switch 20B.

Protocol server 16 provides network services to protocol clients according to a network protocol. For example, in one embodiment, protocol server 16 is configured to implement a DNS (Domain Name System) server. A protocol client 12 can request an IP (Internet Protocol) address that corresponds to a particular domain name from DNS protocol server 16. DNS protocol server 16 responds by sending the protocol client 12 a message that includes the requested IP address according to the DNS protocol. Protocol client 12 can then use the IP address assigned by the DNS protocol server 16 to communicate with other clients via network 10.

In another embodiment, protocol server 16 is configured to implement a DHCP (Dynamic Host Configuration Protocol) server. A protocol client 12 may send a message requesting an IP address from protocol server 16. In response to the request, protocol server 16 sends a message assigning an IP address to the protocol client 12.

In other embodiments, many additional network service protocols can be implemented in addition to and/or instead of DNS and DHCP. For example, in another embodiment, protocol server 16 is a Reverse ARP (Address Resolution Protocol) server.

Each switch 20 (and/or router or other network device in network 10) includes a snooping agent 50. As shown in FIG. 1, switch 20A includes snooping agent 50A and switch 20B includes snooping agent 50B.

Each snooping agent 50 is configured to intercept protocol messages being sent between protocol clients 12 and protocol server 16 via network 10. In response to the intercepted protocol messages, snooping agent 50 updates protocol status information locally to a network device (e.g., switch 20 or a router) in which snooping agent 50 is implemented. Thus, each snooping agent 50 is an example of a means for updating protocol status information in response to intercepting a protocol message being conveyed between a protocol client and a protocol server. This protocol status information includes network traffic information indicative of how messages (both protocol messages and non-protocol messages) are conveyed to network 10 by each of protocol clients 12. For example, snooping agent 50A can store information indicating which of the physical and/or logical interfaces included in switch 20A received a protocol message from client 12B requesting a network service. The protocol status information may also include information included in the protocol messages themselves. For example, snooping agent 50A can store information, such as an IP address, included in protocol server 16's reply to the protocol request from client 12B. Thus, the protocol status information can also include protocol information generated by protocol server 16. Each snooping agent 50 can then use its protocol status information to determine whether to perform various security actions such as dropping messages.

Figure 2A:
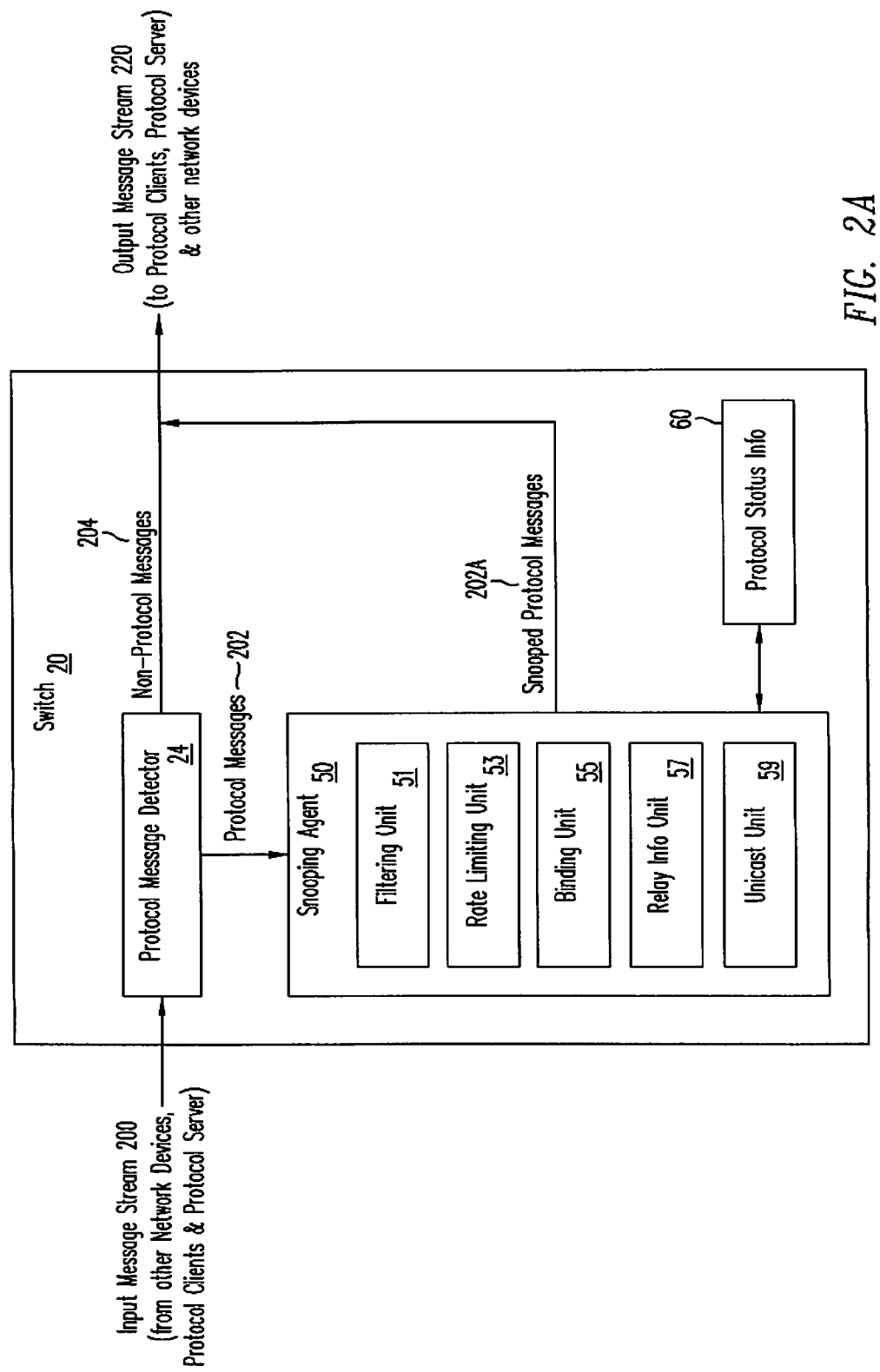
FIG. 2A shows a block diagram of a switch configured to snoop protocol messages being conveyed via a network and to update protocol status information in response to the snooped protocol messages, according to one embodiment.

FIG. 2A shows a block diagram of a switch 20 that snoops protocol messages being conveyed via a network and updates protocol status information in response to the snooped protocol messages. As shown in FIG. 2A, switch 20 includes a protocol message detector 24, a snooping agent 50, and a storage unit that stores protocol status information 60. Protocol status information 60 can be stored in various types of memory, including ROM (Read Only Memory), RAM (Random Access Memory), MEMS (Micro Electro-Mechanical Systems) memory, Flash memory, and the like.

As shown in FIG. 2A, switch 20 may receive an input message stream 200 via various logical and/or physical interfaces. The input message stream 200 may include various protocol messages 202 being conveyed between protocol server 16 and protocol clients 12 of FIG. 1. Additional messages 204 (e.g., data messages or messages implementing other protocols that are not intercepted by snooping agent 50) being conveyed via network 10 of FIG. 1 may also be included in the input message stream 200. Once the protocol messages 202 identified by protocol message detector 24 are processed by snooping agent 50, snooped protocol messages 202A (which may include modified versions of the protocol messages 202 input to snooping agent 500 and/or fewer messages than input protocol messages 202) are output with non-protocol messages 204 as part of output message stream 220 to other network devices, protocol clients, and/or protocol servers).

Figure 2B:
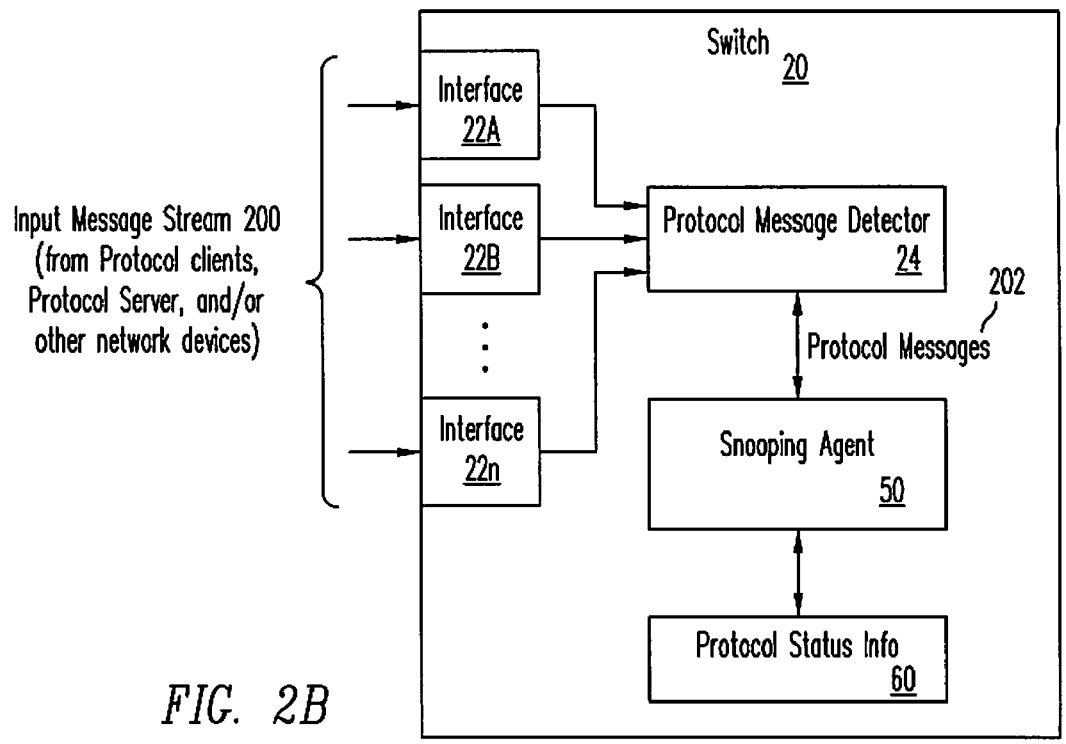
FIG. 2B shows another block diagram of a switch configured to snoop protocol messages being conveyed via a network and to update protocol status information in response to the snooped protocol messages, according to one embodiment.

FIG. 2B illustrates how switch 20 may include several interfaces 22A-22n (collectively, interfaces 22) that each interface to one or more other network devices, protocol clients, and/or protocol servers. Interfaces 22 can each be a logical or a physical interface. For example, interfaces 22A-22B can be included in the same physical interface, but interface 22A may handle messages being conveyed in one VLAN while interface 22B handles messages being conveyed in another VLAN. As noted above, in some embodiments, interfaces 22 can be organized hierarchically.

Returning to FIG. 2A, protocol message detector 24 is configured to identify protocol messages 202 that are received in input message stream 200. In one embodiment, protocol message detector 24 can be implemented using a CAM (Content Addressable Memory) and/or ACL (Access Control List). For example, information from each message can be input into a CAM, which responds by outputting a corresponding index, which is then used to lookup information in an ACL. If the message is a protocol message, the indexed information in the ACL may indicate that the protocol message should be handled by snooping agent 50. Alternatively, protocol message detector 24 can be implemented as a software process that analyzes each message in order to identify which messages are protocol messages. In other embodiments, other types of software and/or hardware can be used to implement protocol message detector 24.

In some embodiments, information in each message that identifies a source and/or destination software port is used by protocol message detector 24 to identify protocol messages. For example, if protocol messages requesting network services provided by the DNS protocol are addressed to server port 53, protocol message detector 24 can readily identify protocol messages to server port 53 as DNS protocol messages.

Whenever protocol message detector 24 identifies a protocol message (e.g., if the protocol being snooped is DHCP, protocol message detector 24 can identify DHCP messages in the message stream based on the software port to or from which the messages are addressed, as described above), the protocol message detector 24 causes the identified protocol message to be forwarded to snooping agent 50. For example, in one embodiment, protocol message detector 24 generates an interrupt, causing a software process implementing all or part of snooping agent 50 to be initiated to handle the identified protocol message. Snooping agent 50 can include a queue (not shown) to temporarily buffer protocol messages identified by protocol message detector 24.

In some embodiments, protocol message snooping is limited to a particular VLAN (Virtual Local Area Network) or performed differently depending on the VLAN in which the protocol message is being conveyed. In these situations, protocol message detector 24 also takes VLAN into account when identifying protocol messages within the input message stream. For example, if protocol message snooping is enabled for one VLAN but not for another, protocol message detector 24 only identifies protocol messages being conveyed in the VLAN for which snooping is enabled.

In response to receiving protocol messages detected by protocol message detector 24, snooping agent 50 performs various functions on and/or in response to the protocol messages. In the embodiment of FIG. 2A, snooping agent 50 includes filtering unit 51, rate limiting unit 53, binding unit 55, relay information unit 57, and unicast unit 59. In other embodiments, snooping agent 50 may include fewer or additional functional units. Snooping agent 50 can be implemented in hardware, software, or a combination of the two.

Filtering unit 51 filters protocol messages that are not consistent with protocol status information 60 from the message stream (e.g., by dropping those messages). In one embodiment, filtering unit 51 can verify a protocol message by comparing information included in a particular protocol message with information stored in protocol status information 60. If the information does not match, filtering unit 51 drops the message. For example, filtering unit 51 can handle a protocol message that includes information indicating that the protocol message is a reply from a protocol server to a protocol client. Filtering unit 51 accesses information included in protocol status information 60 to determine whether the protocol client currently has an outstanding protocol request. If there is no corresponding outstanding request, filtering unit 51 drops the reply. In some embodiments, performing this type of filtering makes it more difficult for a protocol server to be imitated by another device coupled to the network.

Similarly, filtering unit 51 can determine whether a protocol message (or non-protocol message) that includes information indicating that the message was sent by a particular client or server was actually sent by that client or server. This determination is based on information in protocol status information 60 indicating what network services (e.g., IP addresses) have been provided to particular clients and how protocol clients convey messages to the network. For example, protocol status information 60 can include network traffic information associating each client and each server with a particular interface 22 of switch 20. This information is typically obtained by snooping agent 50 the first time a protocol message from each client and each server is received into the switch 20 (in some embodiments, such information may also be obtained in response to non-protocol messages). This information is then maintained in protocol status information 60.

If a subsequent protocol or non-protocol message purporting to be from a particular client or server is received via a different interface than the interface identified in protocol status information 60 as being associated with that client or server, filtering unit 51 drops the message. This type of filtering interferes with the ability of a device coupled to the network to imitate a legitimate protocol client or server. Types of filtering such as this can be used to verify non-protocol messages being sent by a protocol client to a device other than a protocol server.

Rate limiting unit 53 drops protocol messages if a rate limit for protocol messages is exceeded. Information indicating the rate limit is included in protocol status information 60 in some embodiments. Depending on the embodiment, rate limiting may be performed on a per interface and/or per type (e.g., client-generated or server-generated) of protocol message basis. For example, client-generated protocol messages can be rate limited, while server-generated protocol messages are not rate limited. Alternatively, an independent rate limit can be associated with each interface (or group of interfaces). The rate limiting unit 53 applies the associated rate limit to protocol messages being communicated via a particular interface. If the rate limit at a particular interface (or group of interfaces) is exceeded, rate limiting unit 53 can disable that interface (or group of interfaces).

In one embodiment, rate limiting unit 53 implements a rate limiting algorithm based on the time at which a protocol message is received and the current value of a counter indicative of how many protocol messages have already been received during a given time interval. The counter can be associated with a particular interface (e.g., each interface 22 of FIG. 2B can have an associated counter, in one embodiment) or with a group of interfaces. The counter is reset periodically or reset based on certain conditions. Each time a new protocol message is received via an associated interface, rate limiting unit 53 increments the counter. For each protocol message received via the associated interface, rate limiting unit 53 compares the value in the counter to the rate limit for the associated interface. If the comparison indicates that the rate limit is exceeded, rate limiting unit 53 drops the protocol message, disables the associated interface, and/or logs an error message.

Binding unit 55 stores information obtained from intercepted protocol messages as part of protocol status information 60. For example, in an embodiment in which snooping agent 50 snoops DHCP messages, binding unit 55 can store an IP address assigned to a DHCP client by a DHCP server as part of protocol status information 60. Binding unit 55 can also store additional information identifying the DHCP client with that IP address. For example, binding unit 55 can store the DHCP client's MAC (Media Access Control) address and information identifying the VLAN in which that DHCP client is included. Binding unit 55 can also store information indicating how messages are communicated to that DHCP client. For example, binding unit 55 can store information identifying which interface 22 is coupled to receive messages from that DHCP client. Binding unit 55 also modifies (e.g., by changing, supplementing, and/or deleting) existing protocol status information 60 in response to subsequent protocol messages.

The integrity of protocol status information 60 affects how well filtering unit 51 identifies protocol messages to filter from the message stream. Accordingly, binding unit 55 can be configured to only modify protocol status information 60 in response to a snooped protocol message if that message has already been verified as being consistent with protocol status information 60 by filtering unit 51. This way, binding unit 55 will not modify protocol status information 60 in response to a protocol message that is filtered by filtering unit 51.

In some embodiments, binding unit 55 updates protocol status information 60 in response to protocol messages that are received via an interface to protocol clients and/or servers but does not update protocol status information 60 in response to protocol messages received via an interface to another network device that includes its own snooping agent 50. Stated another way, if switch 20 is the first switch (or other network device that includes snooping agent 50) in network 10 to handle messages sent by a particular protocol client, binding unit 55 updates protocol status information 60 in response to messages sent to and/or from that protocol client. If switch 20 is not the first switch in network 10 to handle messages sent by that protocol client, binding unit 55 will not update protocol status information 60 in response to messages to and from that protocol client. In this way, each switch in network 10 may be responsible for maintaining protocol status information 60 for a subset of the total group of protocol clients and/or servers coupled by the network. For example, looking at FIG. 1, switch 20A is responsible for updating its protocol status information in response to protocol messages to and from protocol clients 12A and 12B, while switch 20B is responsible for updating its protocol status information in response to protocol messages to and from protocol client 12C and protocol server 16.

Information indicating which interfaces 22 are coupled to protocol clients and/or servers and which interfaces 22 are coupled to other network devices may be programmed into switch 20 in some embodiments. For example, configuration information indicating which interfaces 22 are coupled to other network devices that include snooping agents 50 and which interfaces 22 are coupled to protocol clients may be loaded into a memory device included in switch 20 by a network administrator. Alternatively, each switch can learn which of its interfaces are coupled to protocol clients and/or servers, as opposed to being coupled to other network devices, by snooping protocol and/or non-protocol messages and updating protocol status information 60 to include information indicative of network traffic in response to the snooped messages, as described above.

Binding unit 55 may store information, generated by a protocol server, indicating how assigned network services may be used by a protocol client to which those services are assigned (such information may be stored in binding table 70, as described below with respect to FIG. 2C). For example, in certain protocols such as DHCP, assigned network services can be associated with lease times indicative of how long a client is allowed to continue using its assigned network services. In embodiments in which protocol messages for such a protocol are being snooped, binding unit 55 establishes a lease timer (e.g., as a value or set of values in protocol status information 60 that is incremented or decremented periodically). Similar information indicative of how a protocol server has indicated that a network service may be used by a client to which that network service is assigned may also be stored in protocol status information 60. Filtering unit 51 can use this information to determine whether a client is using its assigned network services consistently with the protocol server's limitations on those network services. If a protocol client that sends a protocol message is not using an assigned network service consistently with the information stored by binding unit 55, filtering unit 51 may drop the protocol message.

Relay information unit 57 verifies and/or modifies relay information included in protocol messages. Relay information is information that is be added to protocol messages by network devices (e.g., routers and switches) and used by various network devices to verify certain protocol message behavior. Relay information can be removed from protocol messages before those protocol messages are conveyed to protocol clients. One example of such relay information is provided in RFC 3046, which describes relay information that can be added to DHCP messages. Relay information unit 57 (and/or filtering unit 51) verifies protocol messages based on relay information included within those protocol messages. Relay information unit 57 can also remove relay information from a protocol message before that protocol message is sent to a protocol client. In one embodiment, relay information unit 57 adds relay information to the protocol message if switch 20 is the first network device with a snooping agent in network 10 to handle the protocol message. If switch 20 is not the first network device with a snooping agent in network 10 to handle the protocol message, relay information unit 57 verifies any preexisting relay information.

Unicast unit 59 detects protocol messages being sent from a protocol server to a protocol client and causes the detected messages to be unicast to the destination protocol client instead of being broadcast or multicast to multiple recipients. By unicasting the protocol messages, the ability of a device other than the destination client to snoop the information being provided to the client by the protocol server is inhibited. For example, if a DHCP Ack message is being sent, unicasting the message to the destination client makes it more difficult for another device (which might have received the DHCP Ack if the DHCP Ack had been multicast) to obtain the IP address being assigned to that client. This in turn makes it more difficult for the non-destination client to imitate the destination client device on the network.

In one embodiment, snooping agent 50 performs its various functions in the following order: rate limiting, filtering, binding, add/modify relay information, and unicasting. However, this order is merely an example. Other embodiments may order these functions differently.

In some embodiments, switch 20 snoops protocol messages being sent to implement several different protocols. For example, switch 20 can snoop DHCP, DNS, and Reverse ARP messages, generate protocol status information in response to the snooped messages, and perform security actions based on the protocol status information. In some such embodiments, switch 20 includes multiple protocol message detectors 24 (e.g., one protocol message detector 24 for each protocol being snooped), a single protocol message detector 24 configured to identify protocol messages for multiple different protocols, or a combination of such protocol detectors. Similarly, switch 20 can include multiple protocol-specific snooping agents 50 or, alternatively, one snooping agent 50 can maintain protocol status information for multiple different protocols. In some embodiments, protocol status information for each protocol is maintained independently. In other embodiments, protocol status information for the different protocols is collectively maintained and used to perform security actions. For example, information obtained by snooping DHCP messages can be used to filter DNS messages.

It is noted that snooping agent 50 and/or protocol message detector 24 can be implemented differently in different types of network devices. For example, protocol message detector 24 can be implemented in hardware within a switch 20 while being implemented in software within a router.

Figure 2C:
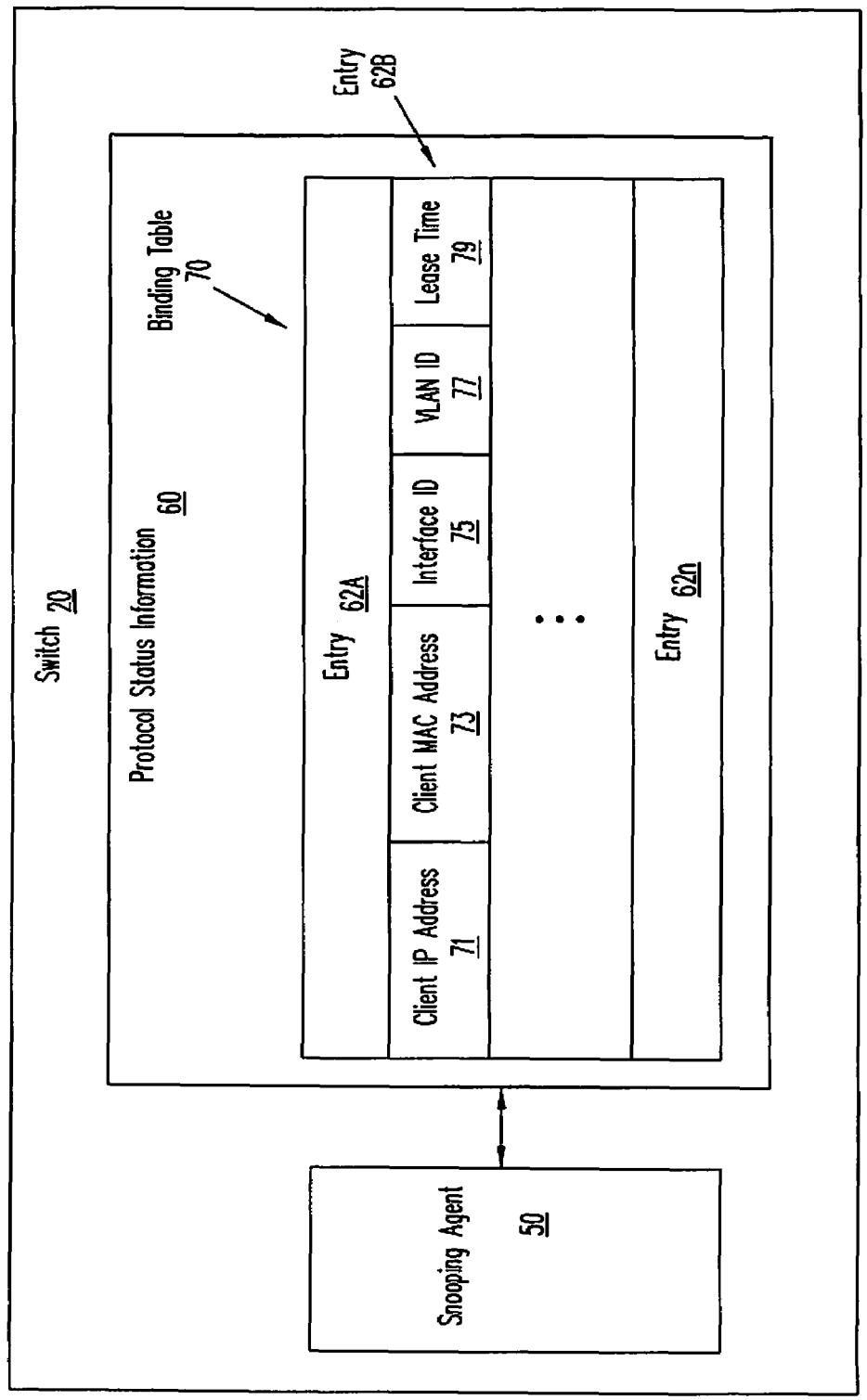
FIG. 2C is yet another block diagram illustrating an example of protocol status information maintained by a network device, according to one embodiment.

FIG. 2C is a block diagram illustrating an example of protocol status information that can be maintained by a network device such as switch 20. In this embodiment, snooping agent 50 intercepts DHCP messages and updates binding table 70 in protocol status information 60 in response to the snooped DHCP messages. Binding table 70 is similar to a binding table typically maintained by a DHCP server. Binding table 70 includes one or more entries 62A-62n (collectively, entries 62) that each correspond to a particular protocol client. As represented by entry 62B, an entry 62 includes client IP address 71, client MAC address 73, interface ID 75 (e.g., identifying the logical and/or physical interface 22 via which messages sent by the client are received into the switch that includes binding table 70), VLAN (Virtual Local Area Network) ID 77 (identifying a VLAN in which the client to which entry 62 corresponds sends protocol messages), and lease time 79. The information illustrated as being included in binding table 70 is merely an example. In other embodiments, different information can be included in a binding table in addition to and/or instead of the information shown in FIG. 2C.

Client IP address 71 may have been generated by protocol server 16 (in this example, a DHCP server) of FIG. 1. Snooping agent 50 obtains client IP address 71 from a protocol message being sent from protocol server 16 to a particular protocol client 12 and stores client IP address 71 in a binding table entry corresponding to that protocol client. Lease time 79 is a value representing the length of time that client IP address 71 may be used by the client to which that IP address is assigned. Snooping agent 50 also obtains this information from the DHCP server reply assigning the IP address to the client.

Snooping agent 50 can obtain other information for storage in binding table 70 from protocol messages generated by clients 12. For example, snooping agent 50 may allocate a binding table entry 62 to a particular client in response to intercepting a DHCP request from that client requesting an IP address from a DHCP server. Snooping agent 50 can obtain client MAC address 73, interface ID 75, and/or VLAN ID 77 from the DHCP request and store this information in the allocated binding table entry.

In one embodiment in which DHCP messages are being intercepted, snooping agent 50 responds to a DHCP ACK message (sent from a DHCP server to a DHCP client to assign an IP address to that client) by allocating an entry 62 in binding table 70 to the DHCP client, if such an entry does not already exist. In response to a DHCP NAK message (sent from a DHCP server to a DHCP client to deny assigning an IP address to that client), snooping agent 50 deletes an existing binding table entry (if any) corresponding to that client. A DHCP NAK message is sent when a client attempts to reuse an IP address and the DHCP server determines that the IP address is not applicable to the client (e.g., because the client has moved to a new subnet). Similarly, in response to a DHCP RELEASE message (sent from a client to a DHCP server to relinquish an IP address assigned to that client), snooping agent 50 deletes an existing binding table entry corresponding to that client. If a DHCP DECLINE message (sent from a client to a DHCP server in response to the client discovering that an IP address is already assigned to another device) is received, snooping agent 50 deletes an existing binding table entry (if any) corresponding to that client.

Generally, snooping agent 50 stores various information, such as an IP address, identifying a network service provided by a protocol server to a protocol client in a binding table entry associated with a particular client. Snooping agent 50 can also store other information identifying that client, such as a client MAC address and an interface ID, in the binding table entry. Snooping agent 50 may use this information to verify subsequent protocol messages. For example, snooping agent 50 can verify the sender of a particular protocol message by comparing the source IP address, MAC address, and interface ID in a particular message with the information stored in binding table 70. If no entry 62 in binding table 70 includes the same combination of source IP address, MAC address, and interface ID, snooping agent 50 determines that the protocol message was not sent by the client identified as the sender and, in response to that determination, drop the protocol message.

A binding table 70 can also be used to store information, such as lease time 79, indicating how network services provided by a particular protocol are to be used. Snooping agent 50 may use this information to verify that network services (e.g., IP addresses) are being used in a manner that is consistent with the protocol. For example, using lease time information 79, snooping agent 50 can examine intercepted protocol messages to determine whether a client is attempting to use an IP address for longer than the client is allowed. If a protocol violation is detected (e.g., if a message sent by a client having a particular IP address is received subsequent to the expiration of the lease time associated with that IP address in the binding table) in a particular message, snooping agent 50 drops that message.

In some embodiments, binding table 70 is implemented as a hash table. To access a binding table entry associated with a particular client, information such as the client's MAC address and VLAN ID is used as a hash key.

Figure 3:
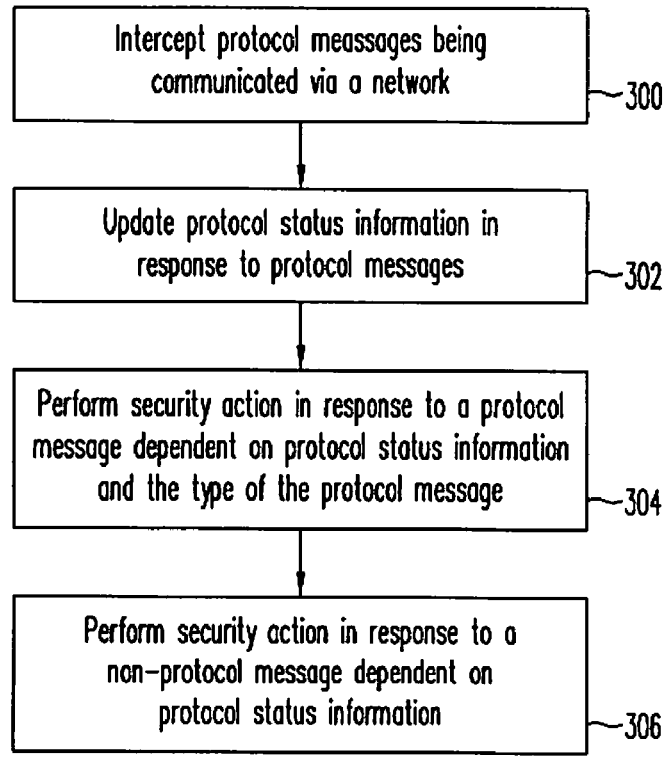
FIG. 3 is a flowchart illustrating one embodiment of a method of snooping protocol messages in order to update protocol status information and to perform security actions dependent on the protocol status information.

FIG. 3 is a flowchart illustrating one embodiment of a method of snooping protocol messages in order to update protocol status information and to perform security actions dependent on the protocol status information. At 300, one or more protocol messages being communicated via a network are intercepted by a network device. The protocol messages are included in a stream of messages input to the network device. In some embodiments, the network device may detect protocol messages based on a server port indicated in the protocol messages.

In response to the intercepted protocol messages, the network device updates protocol status information, as indicated at 302. The protocol status information includes both information included in the protocol messages and information indicative of how the protocol messages are conveyed from one or more protocol clients to the network. For example, in response to receiving a protocol message sent by a protocol client to request a network service, the network device can store information indicating that the protocol request was received via a particular logical and/or physical interface of the network device. The network device can store information indicating that the protocol client has an outstanding protocol request. The network device can also store information included in the protocol request that identifies the client device (e.g., a VLAN ID and/or MAC address). Similarly, in response to a protocol message sent by a protocol server to provide a network service to a client, the network device stores information identifying the network service (e.g., an IP address), the client to which that service is being provided, and/or information (e.g., a lease time) indicating how the client may use the service. The protocol status information can also include information indicative of the rate at which protocol messages are being received from a particular client or group of clients or via a particular interface or group of interfaces.

The network device then uses the protocol status information updated at 302 to determine whether to perform security actions for subsequently received messages. As indicated at 304, the network device performs a security action for a subsequent protocol message dependent on the protocol status information and the type (e.g., client request, server response, and the like) of the subsequent protocol message. Security actions include dropping the protocol message if it includes information that is inconsistent with the protocol status information, updating information included in the protocol message, and/or updating an error log. Note that the network device can also update the protocol status information in response to the subsequently received protocol message.

In some embodiments, the network device also uses the protocol status information to determine whether to perform security actions in response to non-protocol messages, as indicated at 306. For example, a network device may receive, via one of the network device's interfaces, a message containing information indicating that it was sent by a client having a certain IP address, assigned using the network protocol. The network device can verify whether the protocol server assigned that IP address to a client that sends messages to the network via that interface of the network device. If the protocol status information indicates that the client assigned that IP address sends messages to the network via another interface of the network device, or that no client has been assigned that IP address, the network device performs a security action such as dropping the message and/or updating an error log. If the protocol status information instead indicates that the client assigned that IP address does convey messages to the network via that interface of the network device, the network device may allow the message to continue its progress through the network.

Figure 4A:
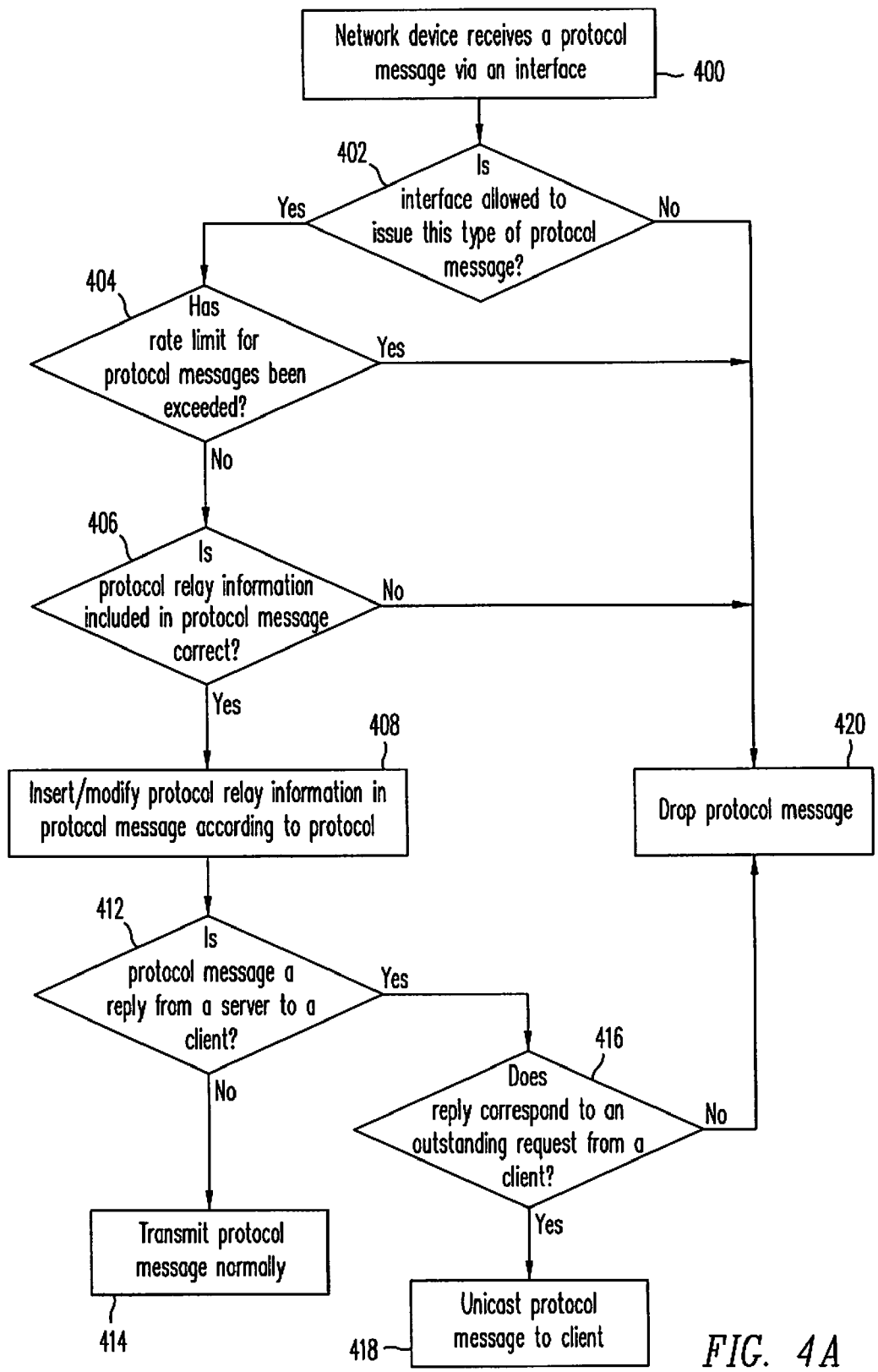
FIG. 4A is a flowchart illustrating various security actions that can be performed dependent upon protocol status information, according to one embodiment.

FIG. 4A is a flowchart illustrating various security actions that can be performed dependent upon protocol status information. In this embodiment, a network device receives a protocol message via a particular logical and/or physical interface, as indicated at 400. Based on protocol status information maintained by that network device, the network device determines whether the interface that received the protocol message is allowed to issue that type of protocol message, as shown at 402. If the interface is not allowed to issue that type of protocol message (e.g., if the interface is not coupled to receive messages from a protocol server, and if the message is of a type that is only allowed to be sent by a protocol server), the network device drops the message, as shown at 420. Otherwise, the network device proceeds to further verify the protocol message at 404.

As indicated at 404, the network device verifies whether a rate limit for protocol messages has been exceeded. If so, the network device drops the protocol message, as shown at 420. The rate of protocol messages can be limited on a per interface (or group of interfaces) and/or a per client (or group of clients) basis in some embodiments.

At 406, the network device verifies whether protocol relay information (if any) included in the protocol message is correct. For example, if the protocol message is a DHCP message, the network device can check to see if another network device has inserted relay information into the protocol message. If so, the network device determines whether the protocol relay information is correct, based on information indicative of the interface via which the message was received.

If the protocol relay information (if any) in the protocol message is correct, the network device can modify or add protocol relay information to the protocol message, as indicated at 408. For example, if no protocol relay information is included in the protocol message (e.g., because this network device is the first network device allowed to add relay information to handle the protocol message), the network device adds protocol relay information to the protocol message. Alternatively, if the network device is outputting the protocol message to a client or server (as opposed to another network device), the network device removes any protocol relay information already included in the message.

If the protocol message is a type of message (e.g., a protocol reply such as a DHCP ACK or DHCP NAK) sent by a protocol server, as determined at 412, the network device accesses the protocol status information to determine whether the protocol message corresponds to an outstanding protocol request from a client, as shown at 416. If the protocol message does not correspond to an outstanding request, the network device drops the protocol message, as shown at 420. Otherwise, the network device unicasts the protocol message to the destination client so that no other clients receive the protocol message, as indicated at 418. If the protocol message is not a type of message sent by a protocol server, the network device transmits the protocol message normally (e.g., if the protocol message is identified as a message that should be flooded or multicast, the network device will appropriately flood or multicast the protocol message), as shown at 414.

Figure 4B:
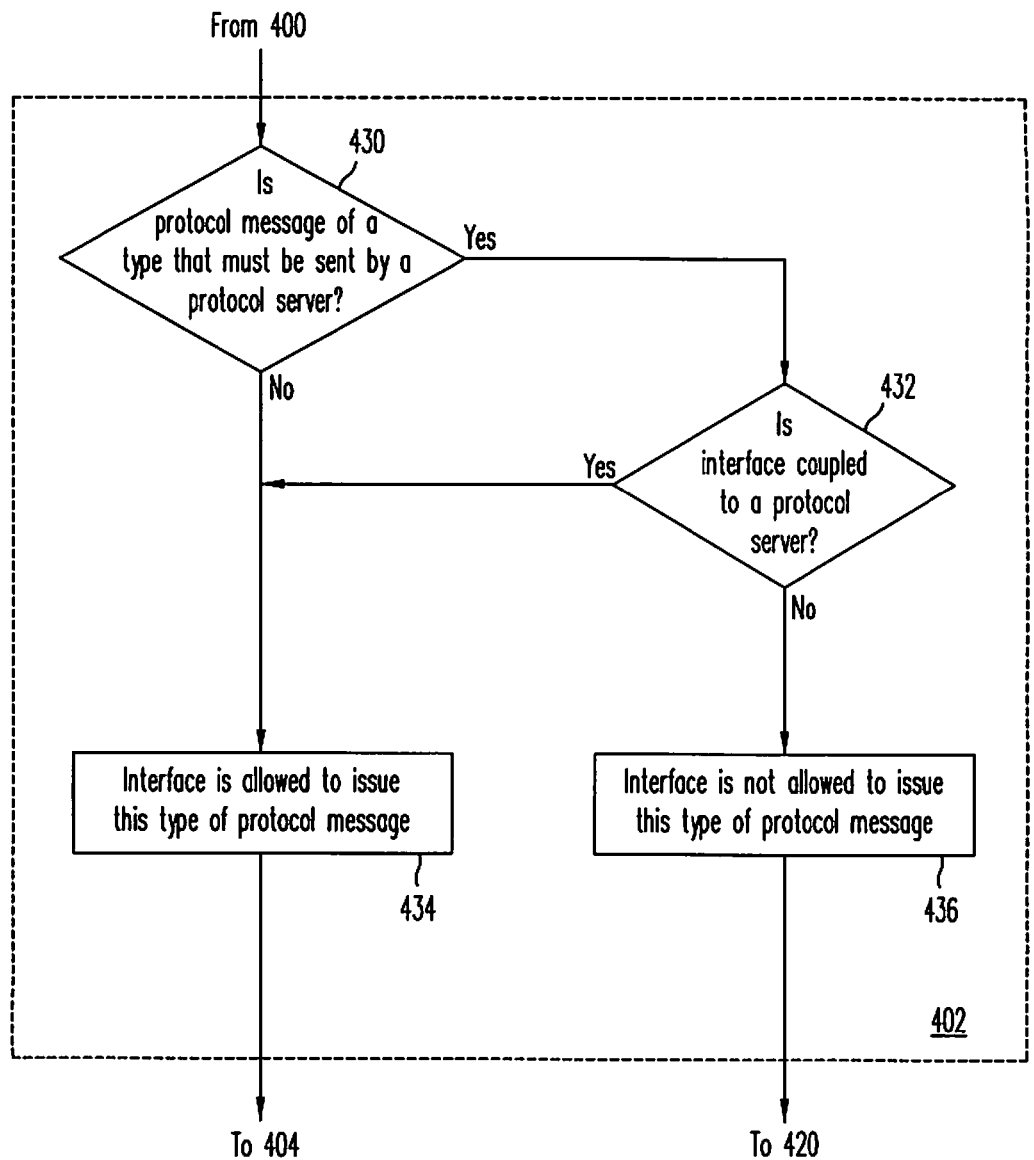
FIG. 4B is a flowchart illustrating additional details of how protocol status information is used to verify protocol messages in the embodiment of FIG. 4A.

FIG. 4B is a flowchart illustrating additional details of how protocol status information is used to verify that a particular interface is allowed to issue a particular type of protocol messages in the embodiment of FIG. 4A. At 430, the network device determines whether the protocol message is of a type that must be sent by a protocol server. For example, if the protocol message is a DHCP message, the network device identifies messages of types DHCP OFFER, DHCP ACK, and DHCP NAK as messages that only a DHCP server is allowed to send. If the protocol message is of a type that is not required to be sent by a protocol server, the network device determines that the interface is allowed to issue this type of protocol message, as shown at 434. Note that in some embodiments, if the protocol message is of a type that may only be sent by a protocol client, the network device additionally verifies whether there are any protocol clients coupled to send messages via that interface before reaching the determination at 434.

If the protocol message is of a type that can only be sent by a protocol server, the network device accesses protocol status information to determine whether the interface via which the protocol message was received into the network device is coupled to receive messages from a protocol server, as shown at 432. If the protocol status information indicates that a protocol server is coupled to that interface, then the network device determines that the interface is allowed to issue that type of protocol message. Otherwise, the network device determines that the interface is not allowed to issue that type of protocol message, as indicated at 436. In response, the protocol message is dropped, as shown at 420 of FIG. 4A.

Figure 5:
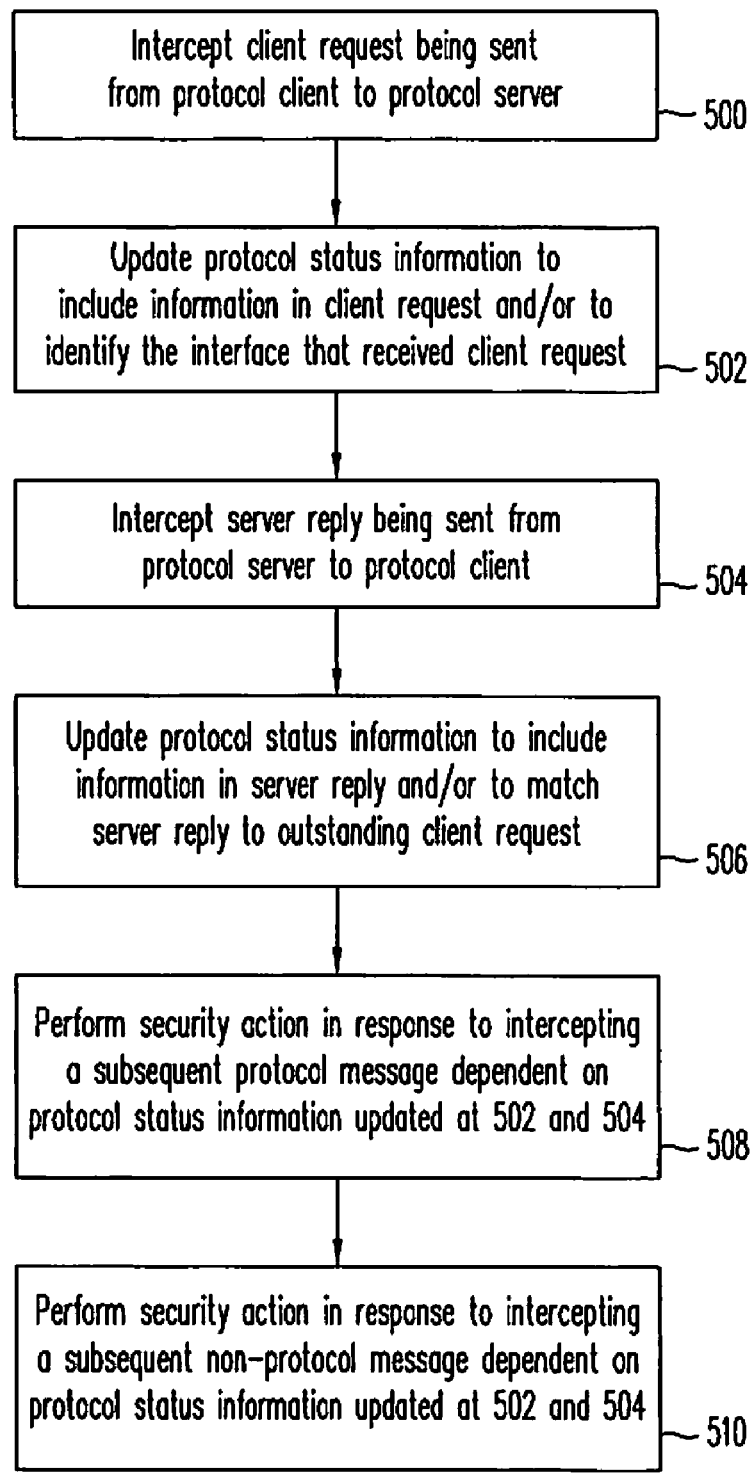
FIG. 5 is a flowchart illustrating how protocol status information is obtained by intercepting a protocol request from a protocol client and a protocol reply from a protocol server and how this protocol status information is then used to verify other protocol messages, according to one embodiment.

FIG. 5 is a flowchart illustrating how protocol status information is obtained from intercepting a protocol request from a protocol client and a protocol reply from a protocol server and how this protocol status information is then used to verify other protocol messages, according to one embodiment. At 500, a protocol message is intercepted. The protocol message contains a client request for network services that is being sent from a protocol client to a protocol client via a network. In response to the intercepted client request protocol message, protocol status information is updated at 502 to include information in the protocol message and/or to identify the interface that received the client request. The protocol status information can also be updated to indicate that the protocol client has an outstanding protocol request.

At 504, a protocol message that contains a protocol server reply is intercepted as the protocol message is being sent from the protocol server to the protocol client. In response, the protocol status information is updated at 506 to include information in the server reply and/or to match the server reply to the outstanding client request intercepted at 500.

Dependent upon the protocol status information updated at 502 and 506, a security action is performed at 508 in response to intercepting a subsequent protocol message. A security action can involve dropping the subsequent protocol message or logging an error. For example, the protocol status information can be used to verify the identity of the sender of the subsequent protocol message, or to determine that a preset rate limit of protocol messages has not been exceeded. Note that the protocol status information can also be updated in response to the subsequent protocol message. In some embodiments, the protocol status information updated at 502 and 506 is also used to determine whether to perform a security action in response to intercepting a subsequent non-protocol message, as indicated at 510.

Figure 6:
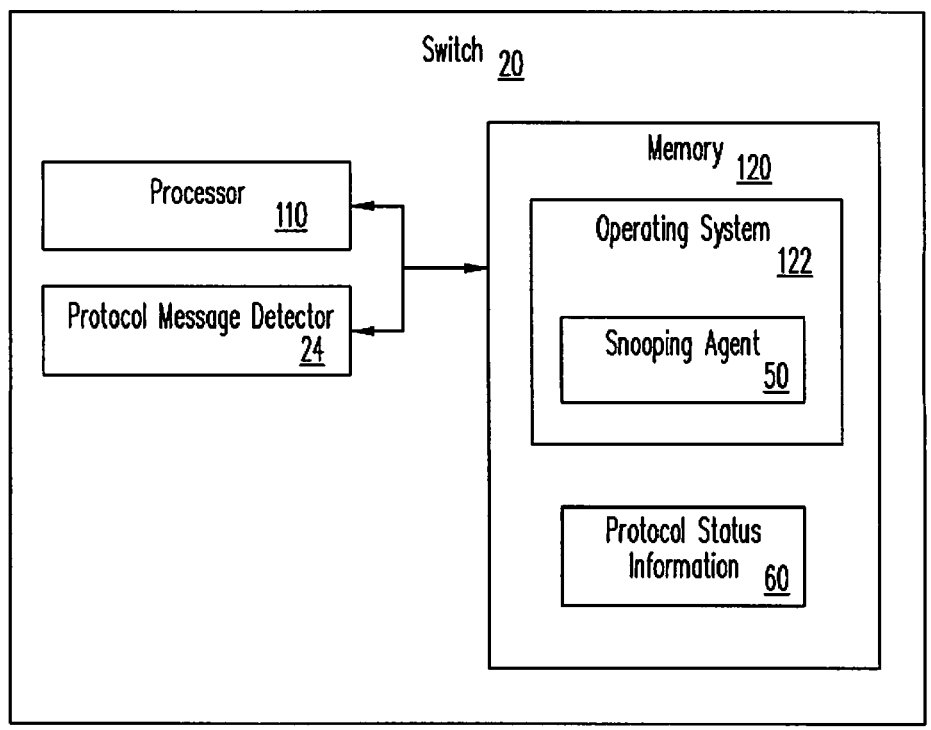
FIG. 6 is a block diagram of a switch illustrating how a snooping agent can be implemented in software executing on the switch, according to one embodiment.

FIG. 6 is a block diagram of switch 20 illustrating how a snooping agent 50 can be implemented in software executing on the switch. As illustrated, switch 20 includes one or more processors 110 (e.g., microprocessors, PLDs (Programmable Logic Devices), or other ASICs (Application Specific Integrated Circuits)) configured to execute program instructions stored in memory 120. Memory 120 can include various types of RAM, ROM, Flash memory, MEMS memory, and the like. In the illustrated embodiment, protocol message detector 24 is implemented in hardware (e.g., using a CAM and/or ACL). Processor 110, protocol message detector 24, and memory 120 are coupled to send and receive data and control signals by a bus or other interconnect.

Memory 120 stores program instructions executable by processor 110 to implement an operating system 122 configured to control basic functionality of switch 20. Operating system 122 can include snooping agent 50 (alternatively, snooping agent 50 can be implemented as a program that interacts with, but is not part of, operating system 122). Memory 120 may also be used to store protocol status information used and maintained by snooping agent 50. Memory 120 is an example of a means for storing protocol status information for a network protocol The program instructions and data implementing snooping agent 50 can be stored upon various computer readable media such as memory 120. In some embodiments, snooping agent 50 software is stored on a computer readable medium such as a CD (Compact Disc), DVD (Digital Versatile Disc), hard disk, optical disk, tape device, floppy disk, and the like). In order be executed by processor 110, the instructions and data implementing snooping agent 50 are loaded into memory 120 from the other computer readable medium. The instructions and/or data implementing can also be transferred to switch 20 via a network such as the Internet or upon a carrier medium. In some embodiments, a computer readable medium is a carrier medium such as a network and/or a wireless link upon which signals such as electrical, electromagnetic, or digital signals, on which the data and instructions implementing snooping agent 50 are encoded, are conveyed.

Although the present invention has been described with respect to specific embodiments thereof, various changes and modifications may be suggested to one skilled in the art. It is intended such changes and modifications fall within the scope of the appended claims.

What is claimed is:

1. A system, comprising:
a protocol status information storage unit comprising protocol status information for a network protocol, wherein
the protocol status information comprises:
protocol information generated by a protocol server; and
network traffic information indicative of how messages are conveyed from a protocol client to a network;
a snooping agent coupled to the protocol status information storage unit, wherein
the snooping agent is configured to update both the protocol information and the network traffic information in response to intercepting a protocol message being conveyed between the protocol client and the protocol server.

2. The system of claim 1, wherein:
the protocol status information comprises information generated by the protocol client.

3. The system of claim 1, further comprising:
a switch, wherein the protocol status information storage unit is comprised in the switch.

4. The system of claim 3, wherein:
the network switch comprises a plurality of interfaces; and
the protocol status information indicates which one of the plurality of interfaces is coupled to convey messages to and from a particular protocol client.

5. The system of claim 4, wherein:
at least some of the plurality of interfaces are logical interfaces.

6. The system of claim 4, wherein:
the plurality of interfaces are implemented in a hierarchy.

7. The system of claim 3, wherein:
the network switch comprises a plurality of interfaces; and
the protocol status information indicates which one of the plurality of interfaces is coupled to convey messages to and from a particular protocol server.

8. The system of claim 7, wherein:
in response to intercepting a protocol reply from the protocol server, the snooping agent is configured to verify that the protocol reply is received via a network interface coupled to the protocol server.

9. The system of claim 1, wherein:
in response to intercepting a protocol reply from the protocol server, the snooping agent is configured to verify that the protocol reply corresponds to an outstanding protocol request generated by one of a plurality of protocol clients.

10. The system of claim 1, wherein:
the network protocol is DHCP (Dynamic Host Configuration Protocol); and
the snooping agent is configured to update the protocol status information to indicate an IP (Internet Protocol) address assigned to the protocol client by the protocol server in the protocol message.

11. The system of claim 1, wherein:
the snooping agent is configured to perform a security action in response to intercepting a subsequent non-protocol message sent by the protocol client, dependent on the protocol status information comprised in the protocol status information storage unit.

12. The system of claim 11, wherein:
if the protocol status information indicates that the protocol client that sent the subsequent non-protocol message is using protocol information sent to a different one of a plurality of protocol clients by the protocol server, the security action comprises dropping the subsequent non-protocol message.

13. The system of claim 1, wherein:
the snooping agent is configured to perform a security action in response to intercepting a subsequent protocol message, dependent on the protocol status information comprised in the protocol status information storage unit.

14. The system of claim 13, wherein:
the security action comprises dropping the subsequent protocol message if the subsequent protocol message is inconsistent with the protocol status information.

15. The system of claim 13, wherein:
the security action comprises dropping the subsequent protocol message if:
  the subsequent protocol message is a type of protocol message required to be generated by the protocol server, and
  the protocol status information indicates that an interface that received the subsequent protocol message is not coupled to receive messages from the protocol server.

16. The system of claim 13, wherein:
the security action comprises dropping the subsequent protocol message if:
  the subsequent protocol message identifies the protocol client as a sender of the subsequent protocol message, and
  the protocol status information indicates that an interface that received the subsequent protocol message is not coupled to receive messages from the protocol client.

17. The system of claim 13, wherein:
the security action comprises dropping the subsequent protocol message if the protocol status information indicates that a maximum rate of protocol messages has been exceeded.

18. The system of claim 17, wherein:
the protocol status information indicates a maximum rate of protocol requests to be received via a particular interface.

19. The system of claim 13, wherein:
if the subsequent protocol message is a protocol reply from the protocol server to one of a plurality of protocol clients, the security action comprises unicasting the protocol reply to the one of the plurality of protocol clients.

20. The system of claim 13, wherein:
the snooping agent is configured to verify protocol relay information comprised in the subsequent protocol message.

21. The system of claim 20, wherein:
the snooping agent is configured to modify protocol relay information comprised in the subsequent protocol message.

22. The system of claim 13, wherein:
the snooping agent is configured to access the protocol status information to determine whether one of a plurality of protocol clients that sent the subsequent protocol message is using protocol information sent to the one of the plurality of protocol clients by the protocol server.

23. The system of claim 13, wherein:
if the protocol status information indicates that one of a plurality of protocol clients that sent the subsequent protocol message is using protocol information sent to a different one of the plurality of protocol clients by the protocol server, the security action comprises dropping the subsequent protocol message.

24. The system of claim 13, wherein:
the security action comprises dropping the subsequent protocol message if the protocol status information indicates that one of a plurality of protocol clients that sent the subsequent protocol message is not using protocol information generated by the protocol server according to policies associated with the protocol information.

25. The system of claim 13, wherein:
the network protocol is a DHCP (Dynamic Host Configuration Protocol).

26. The system of claim 13, wherein:
the network protocol implements DNS (Domain Name Service).

27. A method, comprising:
maintaining protocol status information for a network protocol, wherein the protocol status information comprises:
  protocol information generated by a protocol server, and
  network traffic information indicative of how messages are conveyed from a protocol client to a network; and
updating both the protocol information and the network traffic information in response to intercepting a protocol message being conveyed between the protocol client and the protocol server.

28. The method of claim 27, wherein:
the protocol status information comprises protocol information generated by the protocol client.

29. The method of claim 28, wherein:
said maintaining is performed by a network switch.

30. The method of claim 29, wherein:
the protocol status information indicates which one of a plurality of interfaces comprised in the network switch is coupled to convey messages to and from a particular protocol client.

31. The method of claim 30, wherein:
at least some of the plurality of interfaces are logical interfaces.

32. The method of claim 30, wherein:
the plurality of interfaces are implemented in a hierarchy.

33. The method of claim 29, wherein:
the protocol status information indicates which one of a plurality of interfaces comprised in the network switch is coupled to convey messages to and from a particular protocol server.

34. The method of claim 33, further comprising:
in response to intercepting a protocol reply from the protocol server, verifying that the protocol reply is received via a network interface coupled to the protocol server.

35. The method of claim 27, further comprising:
in response to intercepting a protocol reply from the protocol server, verifying that the protocol reply corresponds to an outstanding protocol request generated by one of a plurality of protocol clients.

36. The method of claim 27, wherein:
the network protocol is DHCP (Dynamic Host Configuration Protocol); and
said updating comprises updating the protocol status information to indicate an IP (Internet Protocol) address assigned to the protocol client by the protocol server in the protocol message.

37. The method of claim 27, further comprising:
initiating a security action in response to intercepting a subsequent non-protocol message, dependent on the protocol status information.

38. The method of claim 27, further comprising:
initiating a security action in response to intercepting a subsequent protocol message, dependent on the protocol status information.

39. The method of claim 38, wherein:
said initiating the security action comprises dropping the subsequent protocol message if the subsequent protocol message is inconsistent with the protocol status information.

40. The method of claim 38, wherein:
said initiating the security action comprises dropping the subsequent protocol message if:
the subsequent protocol message is a type of protocol message required to be generated by the protocol server, and
the protocol status information indicates that an interface that received the subsequent protocol message is not coupled to receive messages from the protocol server.

41. The method of claim 38, wherein:
said initiating the security action comprises dropping the subsequent protocol message if:
the subsequent protocol message identifies the protocol client as a sender of the subsequent protocol message, and
the protocol status information indicates that an interface that received the subsequent protocol message is not coupled to receive messages from the protocol client.

42. The method of claim 38, wherein:
said initiating the security action comprises dropping the subsequent protocol message if the protocol status information indicates that a maximum rate of protocol messages has been exceeded.

43. The method of claim 42, wherein:
the protocol status information indicates a maximum rate of protocol requests to be received via a particular interface.

44. The method of claim 38, wherein:
if the subsequent protocol message is a protocol reply from the protocol server to one of a plurality of protocol clients, said performing the security action comprises unicasting the protocol reply to the one of the plurality of protocol clients.

45. The method of claim 38, further comprising:
verifying protocol relay information comprised in the subsequent protocol message.

46. The method of claim 45, further comprising:
modifying protocol relay information comprised in the subsequent protocol message.

47. The method of claim 38, further comprising:
accessing the protocol status information to determine whether one of a plurality of protocol clients that sent the subsequent protocol message is using protocol information sent to the one of the plurality of protocol clients by the protocol server.

48. The method of claim 38, wherein:
if the protocol status information indicates that one of a plurality of protocol clients that sent the subsequent protocol message is using protocol information sent to a different one of the plurality of protocol clients by the protocol server, said initiating the security action comprises dropping the subsequent protocol message.

49. The method of claim 38, wherein:
said initiating the security action comprises dropping the subsequent protocol message if the protocol status information indicates that one of a plurality of protocol clients that sent the subsequent protocol message is not using protocol information generated by the protocol server according to policies associated with the protocol information.

50. The method of claim 38, wherein:
the network protocol is DHCP (Dynamic Host Configuration Protocol).

51. The method of claim 38, wherein:
the network protocol implements DNS (Domain Name Service).

52. The method of claim 38, further comprising:
accessing an access control list to determine whether a message is a protocol message; and
in response to the access control list indicating that the message is a protocol message, initiating the security action for the message dependent upon the protocol status information.

53. A method, comprising:
intercepting one or more protocol messages being communicated via a network;
updating network traffic information in response to the one or more protocol messages, wherein the network traffic information indicates which one of a plurality of interfaces is coupled to convey messages to and from a particular protocol client; and
initiating a security action in response to a protocol message of the one or more protocol messages, dependent on the network traffic information and a type of the protocol message.

54. A system, comprising:
means for storing protocol status information for a network protocol, wherein the protocol status information comprises:
protocol information generated by a protocol server, and
network traffic information indicative of how messages are conveyed from a protocol client to a network; and
means for updating both the protocol information and the network traffic information in response to intercepting a protocol message being conveyed between the protocol client and the protocol server.

55. The system of claim 54, wherein:
the means for storing protocol status information and the means for updating the protocol status information are comprised in a network switch.

56. The system of claim 55, wherein:
the protocol status information indicates which one of a plurality of interfaces comprised in the network switch is coupled to convey messages to and from a particular protocol client.

57. The system of claim 55, further comprising:
in response to intercepting a protocol reply from the protocol server, the means for updating the protocol status information verify that a protocol reply is received via a network interface coupled to the protocol server, wherein
the protocol status information indicates which one of a plurality of interfaces comprised in the network switch is coupled to convey messages to and from the protocol server.

58. The system of claim 54, further comprising:
in response to intercepting a protocol reply from the protocol server, the means for updating the protocol status information verify that the protocol reply corresponds to an outstanding protocol request generated by one of a plurality of protocol clients.

59. The system of claim 54, wherein:
the network protocol is DHCP (Dynamic Host Configuration Protocol); and the means for updating the protocol status information update the protocol status information to indicate an IP (Internet Protocol) address assigned to the protocol client by the protocol server in the protocol message.

60. The system of claim 54, wherein:
the means for updating the protocol status information initiate a security action in response to intercepting a subsequent non-protocol message; and
the means for updating the protocol status information initiate the security action dependent on the protocol status information.

61. The system of claim 54, wherein:
the means for updating the protocol status information initiate the security action in response to intercepting a subsequent protocol message; and
the means for updating the protocol status information initiate the security action dependent on the protocol status information.

62. The system of claim 61, wherein:
the security action comprises dropping the subsequent protocol message if the subsequent protocol message is inconsistent with the protocol status information.

63. The system of claim 61, wherein:
the security action comprises dropping the subsequent protocol message if:
the subsequent protocol message is a type of protocol message required to be generated by the protocol server, and
the protocol status information indicates that an interface that received the subsequent protocol message is not coupled to receive messages from the protocol server.

64. The system of claim 61, wherein:
the security action comprises dropping the subsequent protocol message if:
the subsequent protocol message identifies the protocol client as a sender of the subsequent protocol message, and
the protocol status information indicates that an interface that received the subsequent protocol message is not coupled to receive messages from the protocol client.

65. The system of claim 61, wherein:
the security action comprises dropping the subsequent protocol message if the protocol status information indicates that a maximum rate of protocol messages has been exceeded.

66. The system of claim 61, wherein:
if the subsequent protocol message is a protocol reply from the protocol server to one of a plurality of protocol clients, the security action comprises unicasting the protocol reply to the one of the plurality of protocol clients.

67. The system of claim 61, wherein:
the means for updating the protocol status information verify protocol relay information comprised in the subsequent protocol message.

68. The system of claim 61, wherein:
the means for updating the protocol status information access the protocol status information to determine whether one of a plurality of protocol clients that sent the subsequent protocol message is using protocol information sent to the one of the plurality of protocol clients by the protocol server; and
if the protocol status information indicates that one of the plurality of protocol clients that sent the subsequent protocol message is using protocol information sent to a different one of the plurality of protocol clients by the protocol server, the security action comprises dropping the subsequent protocol message.

69. The system of claim 61, wherein:
the security action comprises dropping the subsequent protocol message if the protocol status information indicates that one of a plurality of protocol clients that sent the subsequent protocol message is not using protocol information generated by the protocol server according to policies associated with the protocol information.

70. A computer readable storage medium, comprising program instructions executable to:
maintain protocol status information for a network protocol, wherein the protocol status information comprises:
protocol information generated by a protocol server, and
network traffic information indicative of how messages are conveyed from a protocol client to a network; and
update both the protocol information and the network traffic information in response to intercepting a protocol message being conveyed between the protocol client and the protocol server.

71. The computer readable storage medium of claim 70, wherein:
the protocol status information indicates which one of a plurality of interfaces comprised in a network switch is coupled to convey messages to and from a particular protocol client.

72. The computer readable storage medium of claim 70, wherein:
in response to intercepting a protocol reply from the protocol server, the program instructions are executable to verify that a protocol reply is received via a network interface coupled to the protocol server, wherein
the protocol status information indicates which one of a plurality of interfaces comprised in a network switch is coupled to convey messages to and from the protocol server.

73. The computer readable storage medium of claim 70, wherein in response to intercepting a protocol reply from the protocol server the program instructions are executable to:
verify that the protocol reply corresponds to an outstanding protocol request generated by one of a plurality of protocol clients.

74. The computer readable storage medium of claim 70, wherein:
the network protocol is DHCP (Dynamic Host Configuration Protocol); and
the program instructions are executable to update the protocol status information to indicate an IP (Internet Protocol) address assigned to the protocol client by the protocol server in the protocol message.

75. The computer readable storage medium of claim 70, wherein in response to intercepting a subsequent non-protocol message, the program instructions are executable to:
initiate a security action, dependent on the protocol status information.

76. The computer readable storage medium of claim 70, wherein in response to intercepting a subsequent protocol message, the program instructions are executable to:
initiate a security action, dependent on the protocol status information.

77. The computer readable storage medium of claim 76, wherein:
the security action comprises dropping the subsequent protocol message if the subsequent protocol message is inconsistent with the protocol status information.

78. The computer readable storage medium of claim 76, wherein:
the security action comprises dropping the subsequent protocol message if:
the subsequent protocol message is a type of protocol message required to be generated by the protocol server, and
the protocol status information indicates that an interface that received the subsequent protocol message is not coupled to receive messages from the protocol server.

79. The computer readable storage medium of claim 76, wherein:
the security action comprises dropping the subsequent protocol message if:
the subsequent protocol message identifies the protocol client as a sender of the subsequent protocol message, and
the protocol status information indicates that an interface that received the subsequent protocol message is not coupled to receive messages from the protocol client.

80. The computer readable storage medium of claim 76, wherein:
the security action comprises dropping the subsequent protocol message if the protocol status information indicates that a maximum rate of protocol messages has been exceeded.

81. The computer readable storage medium of claim 76, wherein:
if the subsequent protocol message is a protocol reply from the protocol server to one of a plurality of protocol clients, the security action comprises unicasting the protocol reply to the one of the plurality of protocol clients.

82. The computer readable storage medium of claim 76, wherein the program instructions are executable to:
verify protocol relay information comprised in the subsequent protocol message.

83. The computer readable storage medium of claim 76, wherein:
the program instructions are executable to access the protocol status information to determine whether one of a plurality of protocol clients that sent the subsequent protocol message is using protocol information sent to the one of the plurality of protocol clients by the protocol server; and
if the protocol status information indicates that the one of the plurality of protocol clients that sent the subsequent protocol message is using protocol information sent to a different one of the plurality of protocol clients by the protocol server, the security action comprises dropping the subsequent protocol message.

84. The computer readable storage medium of claim 76, wherein:
the security action comprises dropping the subsequent protocol message if the protocol status information indicates that one of a plurality of protocol clients that sent the subsequent protocol message is not using protocol information generated by the protocol server according to policies associated with the protocol information.

* * * * *